(12) United States Patent
Nakamura et al.

(10) Patent No.: US 12,354,804 B2
(45) Date of Patent: Jul. 8, 2025

(54) MULTILAYER CERAMIC ELECTRONIC DEVICE

(71) Applicant: TAIYO YUDEN CO., LTD., Tokyo (JP)

(72) Inventors: Tomoaki Nakamura, Tokyo (JP); Mikio Tahara, Tokyo (JP); Hiroki Shimizu, Tokyo (JP); Masaru Saito, Tokyo (JP); Tomio Inoue, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 177 days.

(21) Appl. No.: 18/362,531

(22) Filed: Jul. 31, 2023

(65) Prior Publication Data

US 2024/0071688 A1 Feb. 29, 2024

(30) Foreign Application Priority Data

Aug. 25, 2022 (JP) .................................. 2022-134234

(51) Int. Cl.
*H01G 4/248* (2006.01)
*H01G 4/30* (2006.01)

(52) U.S. Cl.
CPC .............. *H01G 4/248* (2013.01); *H01G 4/30* (2013.01)

(58) Field of Classification Search
CPC ................................ H01G 4/30; H01G 4/248
See application file for complete search history.

(56) References Cited

U.S. PATENT DOCUMENTS

| | | | | |
|---|---|---|---|---|
| 6,381,117 B1 | 4/2002 | Nakagawa et al. | ........ | 361/306.3 |
| 2009/0303655 A1* | 12/2009 | Ogawa | ...................... | H01G 4/30 |
| | | | | 29/25.42 |
| 2013/0250480 A1* | 9/2013 | Ahn | ........................ | H01G 4/129 |
| | | | | 156/89.12 |
| 2014/0347783 A1* | 11/2014 | Kisumi | ................ | H01G 4/2325 |
| | | | | 427/79 |
| 2015/0318111 A1* | 11/2015 | Lee | ........................ | H01G 4/2325 |
| | | | | 29/25.03 |

FOREIGN PATENT DOCUMENTS

| | | | | | |
|---|---|---|---|---|---|
| CN | 101572185 A | * | 11/2009 | ............. | C25D 15/00 |
| JP | 2001-076957 A | | 3/2001 | | |
| WO | WO-2013108533 A1 | * | 7/2013 | ............. | H01G 4/232 |

* cited by examiner

Primary Examiner — Michael P McFadden
(74) Attorney, Agent, or Firm — Stein IP, LLC

(57) ABSTRACT

A multilayer ceramic electronic device includes a multilayer chip having a plurality of dielectric layers and a plurality of internal electrode layers facing each other through each of the plurality of dielectric layers, an external electrode that is provided on an end face of the multilayer chip in a second direction orthogonal to a first direction in which the plurality of internal electrode layers face each other, and has a plurality of glass portions that are spaced from each other on a surface of the external electrode, and a plated layer that is provided on the external electrode and has discontinuous portions on the plurality of glass portions.

10 Claims, 15 Drawing Sheets

MULTILAYER CERAMIC ELECTRONIC DEVICE

CROSS-REFERENCE TO RELATED APPLICATION

This application is based upon and claims the benefit of priority of the prior Japanese Patent Application No. 2022-134234, filed on Aug. 25, 2022, the entire contents of which are incorporated herein by reference.

FIELD

A certain aspect of the present invention relates to a multilayer ceramic electronic device.

BACKGROUND

In multilayer ceramic electronic devices such as multilayer ceramic capacitors, after mounting, the tip of the external electrode to the inside of the element may flex and crack. In order to suppress these cracks, a resin containing a metal filler is sandwiched between an external electrode and a plated layer to relax the stress and to properly peel off the resin (see, for example, Japanese Patent Application Publication No. 2001-76957). This can improve resistance to deflection. Specifically, it is possible to increase the amount of pressing that cracks enter, and to prevent cracks from entering the interior of a multilayer chip.

SUMMARY OF THE INVENTION

However, if the structure is such that the resin is sandwiched by the external electrode, the resin itself will become thicker, which is disadvantageous in reducing the size and increasing the capacity of the product. In particular, in a low-height product, if the side portion becomes thick, it becomes a big problem. In addition, the number of processes for applying, drying, and curing the resin paste containing the metal filler is increased, leading to an increase in cost.

According to an aspect of the present invention, there is provided a multilayer ceramic electronic device including: a multilayer chip having a plurality of dielectric layers and a plurality of internal electrode layers facing each other through each of the plurality of dielectric layers; an external electrode that is provided on an end face of the multilayer chip in a second direction orthogonal to a first direction in which the plurality of internal electrode layers face each other, and has a plurality of glass portions that are spaced from each other on a surface of the external electrode; and a plated layer that is provided on the external electrode and has discontinuous portions on the plurality of glass portions.

DETAILED DESCRIPTION

A description will be given of an embodiment with reference to the accompanying drawings.

Figure 1:
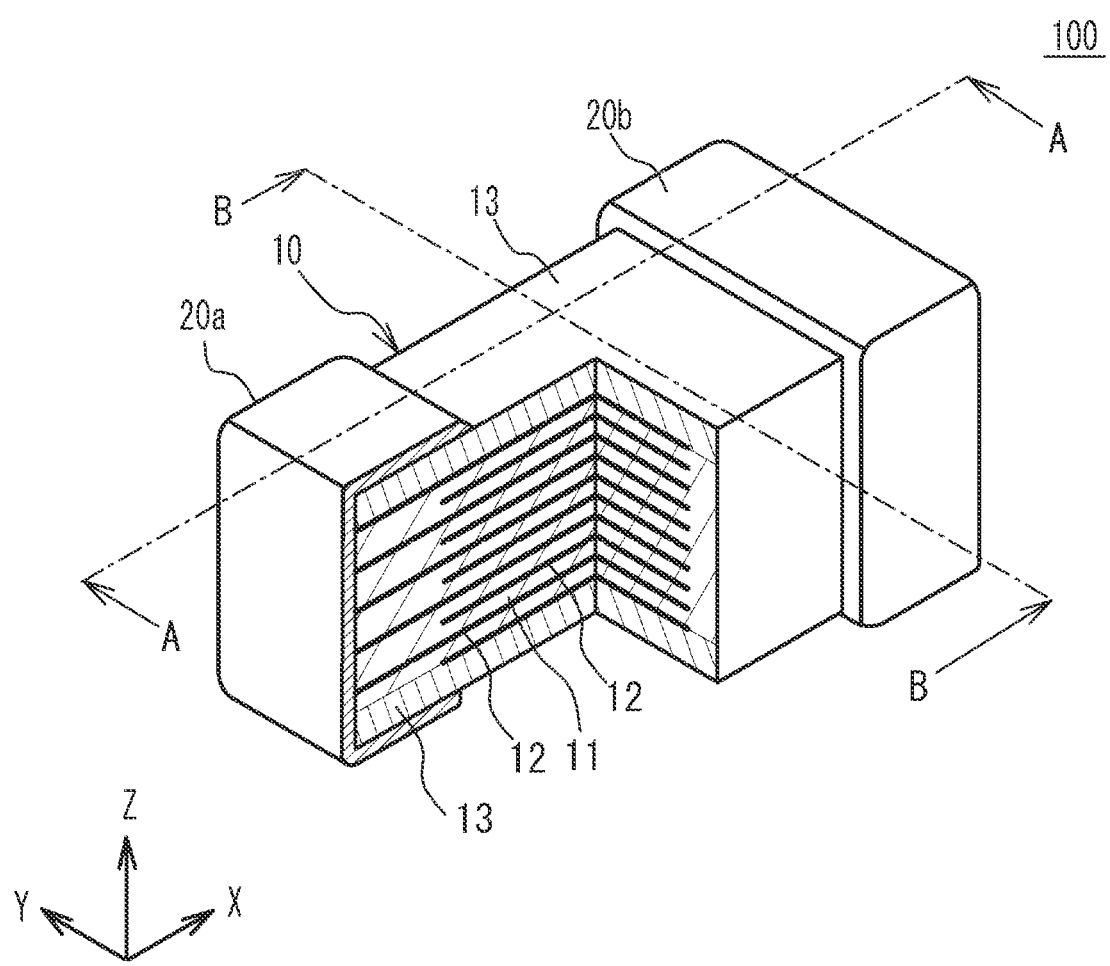
FIG. 1 illustrates a perspective view of a multilayer ceramic capacitor in which a cross section of a part of the multilayer ceramic capacitor is illustrated.
Figure 2:
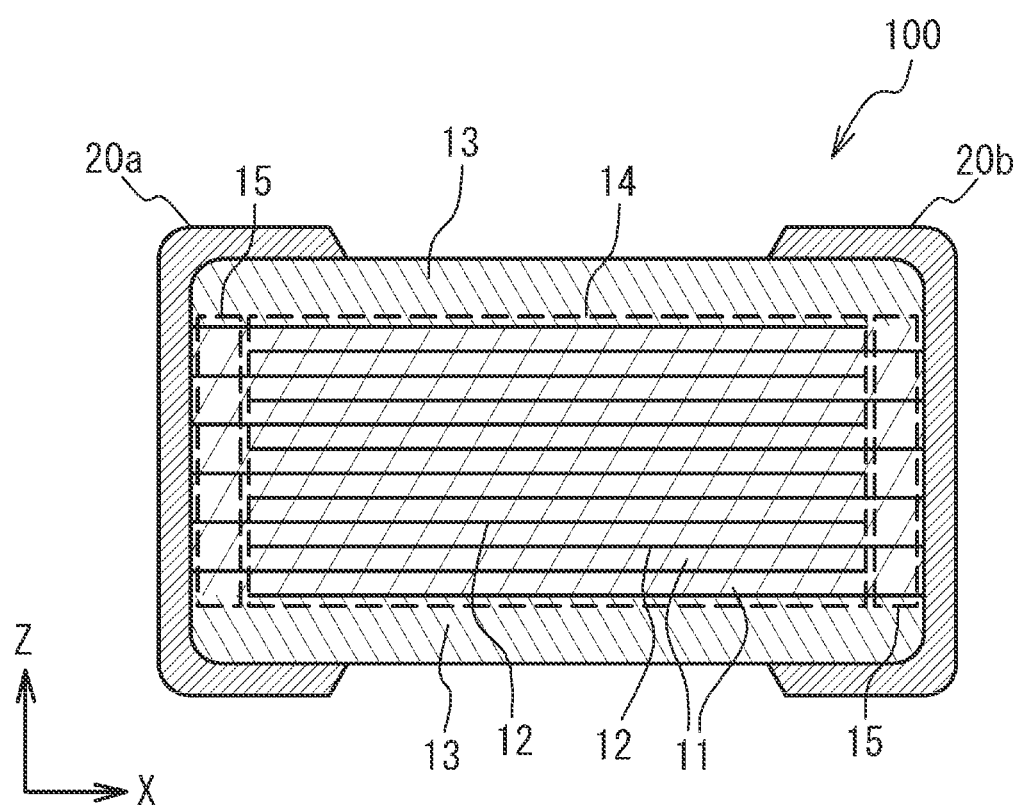
FIG. 2 illustrates a cross sectional view taken along a line A-A of FIG. 1.
Figure 3:
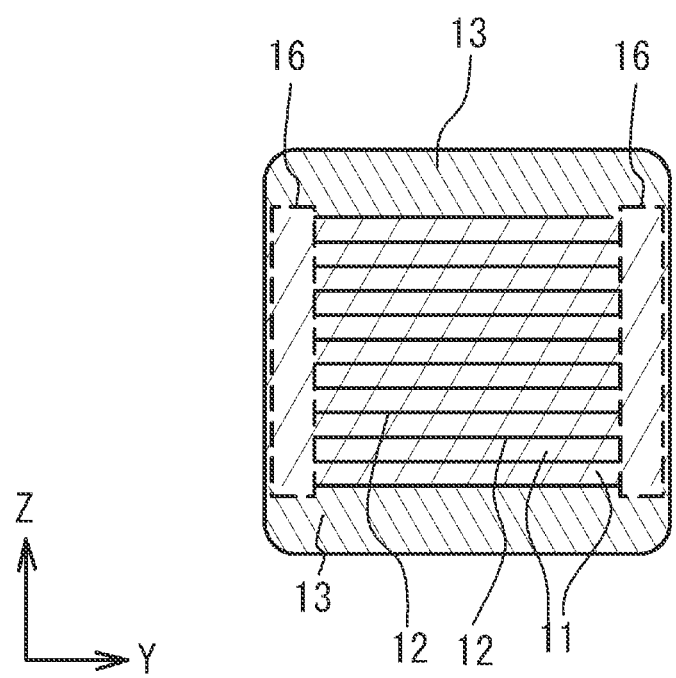
FIG. 3 illustrates a cross sectional view taken along a line B-B of FIG. 1.

FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. In FIG. 1 to FIG. 3, a plated layer 25 described later is omitted.

As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The upper face and the lower face of the multilayer chip 10 are sometimes called main faces, and the upper face, the lower face and the two side faces are sometimes called the peripheral faces. The external electrodes 20a and 20b extend to the upper face, the lower face and the two side faces of the multilayer chip 10. However, the external electrodes 20a and 20b are spaced from each other.

In FIG. 1 to FIG. 3, a Z-axis direction (first direction) is a first direction in which a plurality of internal electrode layers 12 face each other, and is the stacking direction, and is a direction in which the upper face and the lower face of the multilayer chip 10 face each other. The X-axis direction (second direction) is a length direction of the multilayer chip 10, a direction in which the two end faces of the multilayer chip 10 face each other, and a direction in which the external electrodes 20a and 20b face each other. A Y-axis direction (third direction) is a width direction of the internal electrode layers, and is a direction in which two of the four side faces of the multilayer chip 10, excluding the two end faces, face each other.

The multilayer chip 10 has a structure designed to have dielectric layers 11 and internal electrode layers 12 alternately stacked. The dielectric layer 11 includes ceramic material acting as a dielectric material. The internal electrode layers 12 include a metal as a main component. In other words, the multilayer chip 10 includes the plurality of internal electrode layers 12 facing each other and the dielectric layers 11 sandwiched between the plurality of internal electrode layers 12. End edges of the internal electrode layers 12 in an extension direction thereof are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. The internal electrode layer 12 connected to the external electrode 20a is not connected to the external electrode 20b. The internal electrode layer 12 connected to the external electrode 20b is not connected to the external electrode 20a. Thus, the internal electrode layers 12 are alternately conducted to the external electrode 20a and the external electrode 20b. Thus, the multilayer ceramic capacitor 100 has a structure in which a plurality of the dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 may be the same as that of the dielectric layer 11 or may be different from that of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 0.6 mm, a width of 0.3 mm, and a height of 0.110 mm. The multilayer ceramic capacitor 100 may have a length of 1.0 mm, a width of 0.5 mm, and a height of 0.5 mm. The multilayer ceramic capacitor 100 may have a length of 1.0 mm, a width of 0.5 mm, and a height of 0.1 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

A main component of the dielectric layer 11 is a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $MgTiO_3$ (magnesium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. $Ba_{1-x-y}Ca_xSr_yTi_{1-z}Zr_zO_3$ may be barium strontium titanate, barium calcium titanate, barium zirconate, barium titanate zirconate, calcium titanate zirconate, barium calcium titanate zirconate or the like.

Additives may be added to the dielectric layer 11. As additives to the dielectric layer 11, magnesium (Mg), manganese (Mn), molybdenum (Mo), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of cobalt (Co), nickel (Ni), lithium (Li), boron (B), sodium (Na), potassium (K) or silicon (Si), or a glass including cobalt, nickel, lithium, boron, sodium, potassium or silicon. The thickness of the dielectric layer 11 is, for example, 1.0 μm or more and 3.0 μm or less, 2.5 μm or more and 4.5 μm or less, 4.0 μm or more and 6.0 μm or less, or 5.5 μm or more and 7.5 μm or less.

The internal electrode layers 12 are mainly composed of base metals such as Ni, copper (Cu), and tin (Sn). As the first metal of the internal electrode layer 12, noble metals such as platinum (Pt), palladium (Pd), silver (Ag), gold (Au) or alloys containing these noble metals may be used. The internal electrode layer 12 contains a second metal having a melting point lower than that of the first metal as a dissimilar metal element. The thickness of the internal electrode layer 12 is, for example, 0.8 μm or more and 1.2 μm or less, 1.0 μm or more and 1.4 μm or less, 1.2 μm or more and 1.6 μm or less, or 1.4 μm or more and 1.8 μm or less.

The main component of the external electrodes 20a and 20b is a metal such as nickel, copper or the like. The external electrodes 20a and 20b contain a glass component in order to lower the temperature during the heat treatment during firing.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is also the end margin 15. That is, the end margin is a section in which a set of the internal electrode layers 12 connected to one external electrode face each other without sandwiching the internal electrode layer 12 connected to the other external electrode. The end margin is a section that does not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity. The side margin 16 may have the same composition as the composition of the dielectric layers of the capacity section 14 or may have a composition which is different from the composition of the dielectric layers of the capacity section 14.

Figure 4:
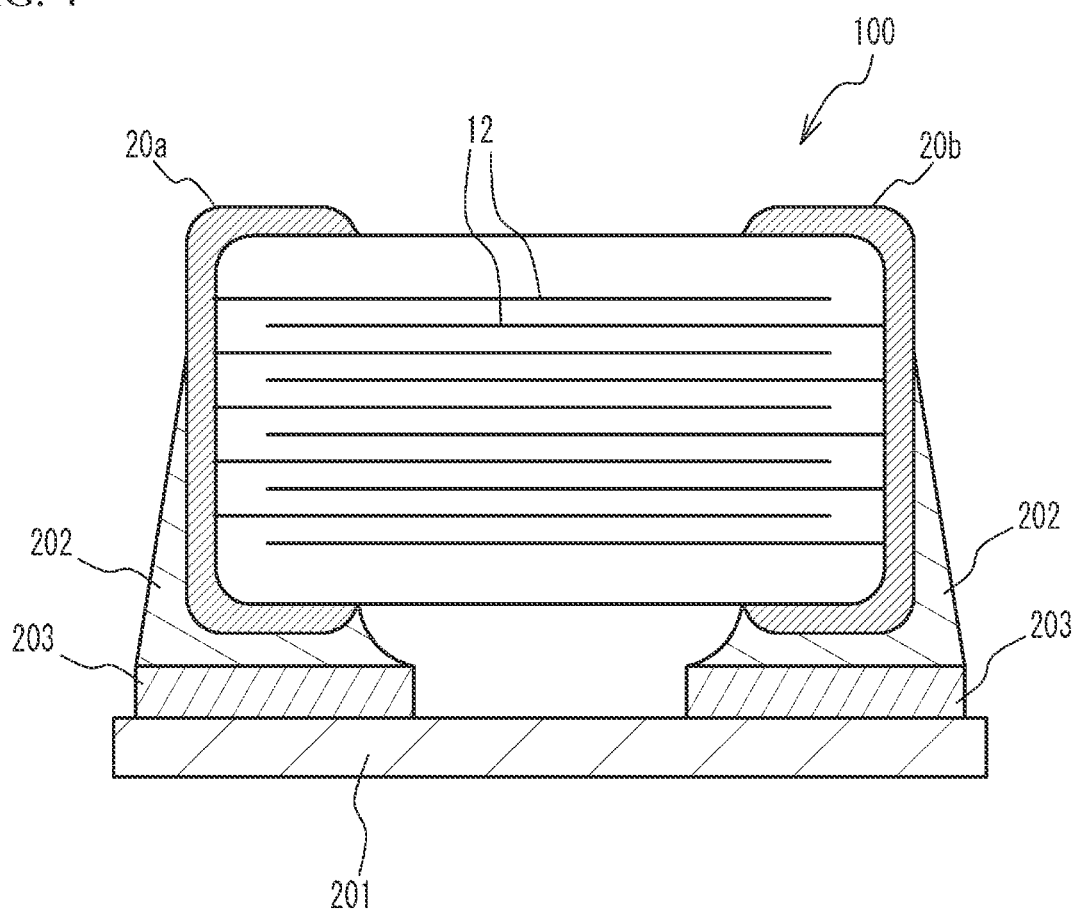
FIG. 4 is a diagram illustrating a state in which a multilayer ceramic capacitor is mounted on a circuit board.

FIG. 4 is a diagram illustrating a state in which the multilayer ceramic capacitor 100 is mounted on a circuit board 201. As illustrated in FIG. 4, the lower face in the stacking direction is arranged so as to face a land 203 on the circuit board 201. The external electrodes 20a and the external electrodes 20b are electrically connected to the circuit board 201 independently of each other via solder 202 to the lands 203 on the circuit board 201.

Figure 5A:
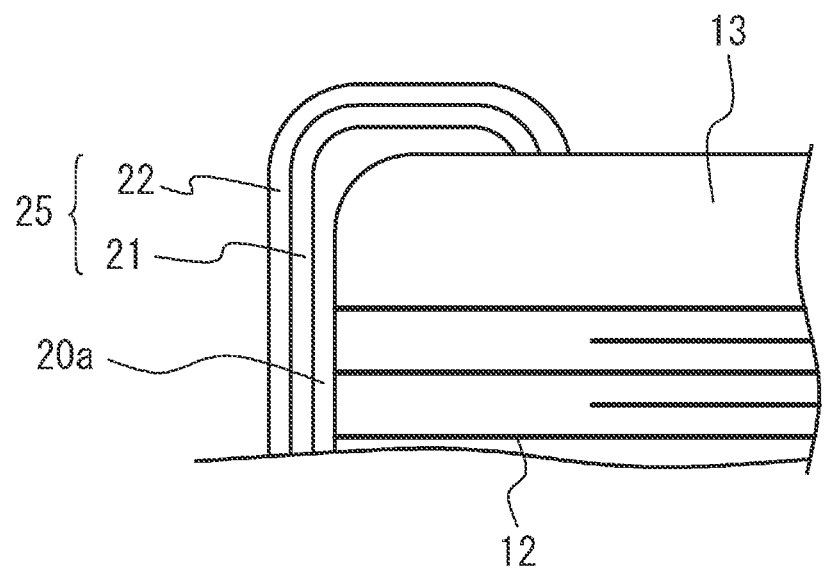
FIG. 5A and FIG. 5B illustrate a plated layer.
Figure 5B:
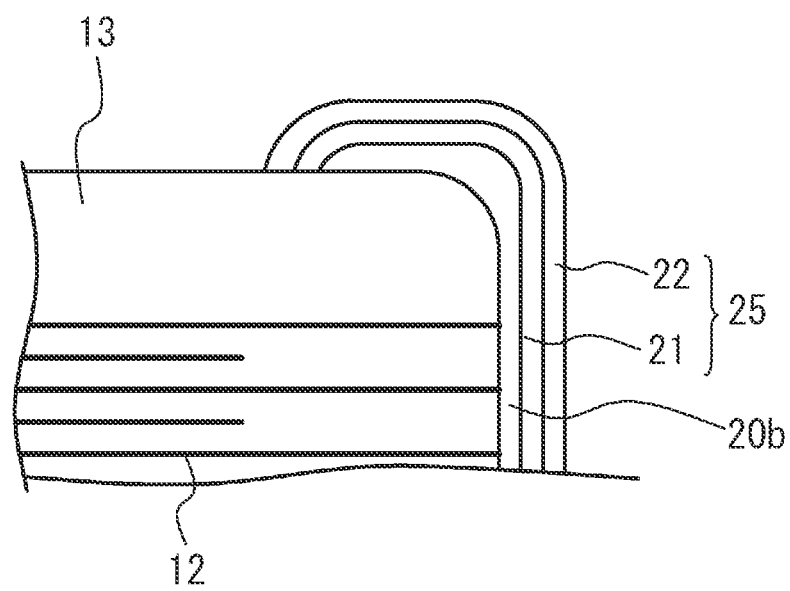

As illustrated in FIG. 5A and FIG. 5B, each of plated layers 25 is provided to cover each of the external electrode 20a and the external electrode 20b. Therefore, the plated layers 25 extend over the upper face, the lower face and the two side faces of the multilayer chip 10. However, the plated layer 25 on the external electrode 20a and the plated layer 25 on the external electrode 20b are separated from each other. During plating, the external electrodes 20a and 20b function as base layers. The plated layer 25 is mainly composed of a metal such as copper, nickel, aluminum, zinc, tin, or an alloy of two or more of them. The plated layer 25 may be a plated layer (single layer) of a single metal component, or may be a plurality of plated layers of mutually different metal components. For example, the plated layer 25 has a structure in which a first plated layer 21 and a second plated layer 22 are formed in this order from the base layer side. The first plated layer 21 is, for example, a nickel plated layer. The second plating layer 22 is, for example, a tin plated layer.

Figure 6:
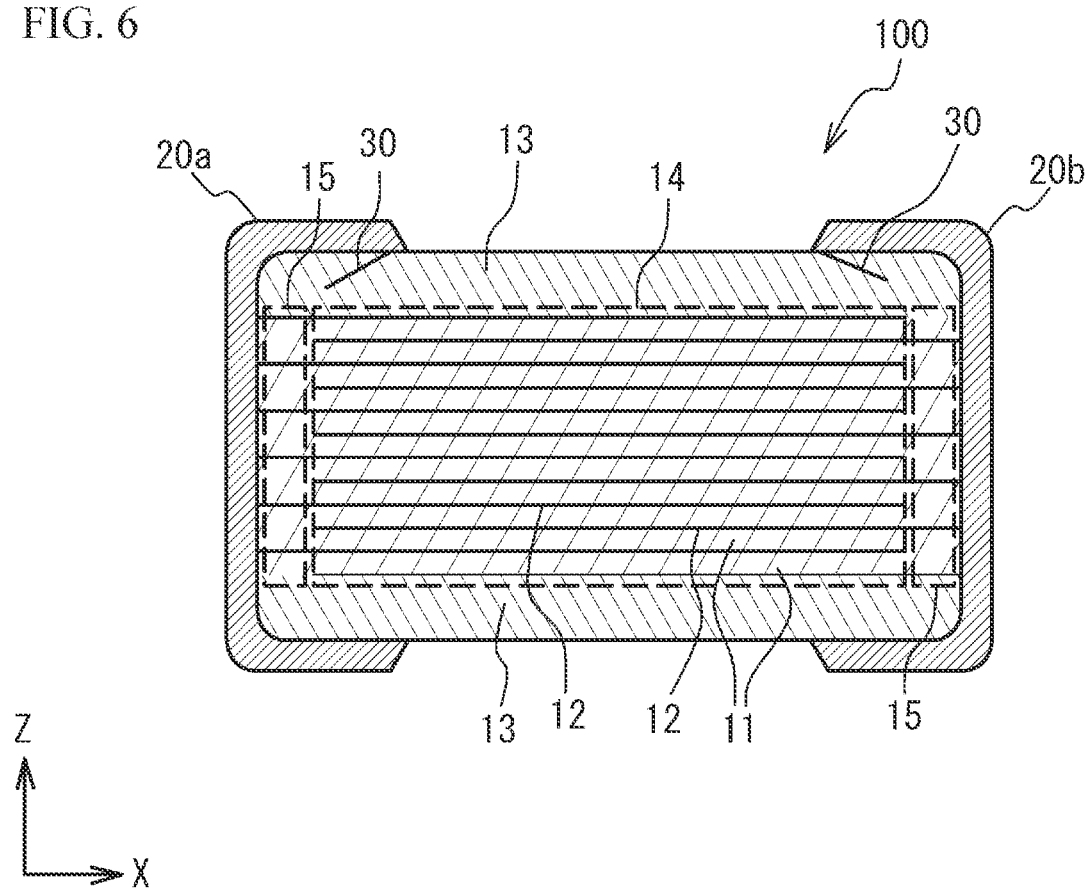
FIG. 6 illustrates a crack.

After the multilayer ceramic capacitor 100 is mounted on the circuit board 201, the external electrodes 20a and 20b deflect from the tips of the external electrodes 20a and 20b to the inside of the multilayer chip 10, and cracks 30 may occur, as illustrated in FIG. 6. Therefore, in order to suppress the occurrence of the cracks 30, a conductive resin containing a metal filler is sandwiched between the external electrodes 20a and 20b and the plated layers 25 to relax the stress, and the conductive resin is designed to be properly peeled off. In this manner, the resistance to deflection can be improved.

However, when the conductive resin is provided, the conductive resin itself becomes thicker, which is disadvantageous in reducing the size and increasing the capacity of the product. In particular, in a low-height product, if the side portion becomes thick, it becomes a big problem. In addition, the number of processes for applying, drying, and curing the resin paste containing the metal filler is increased, leading to an increase in cost.

Therefore, the multilayer ceramic capacitor 100 according to this embodiment has a configuration that can improve the strength to deflection after mounting.

Figure 7:
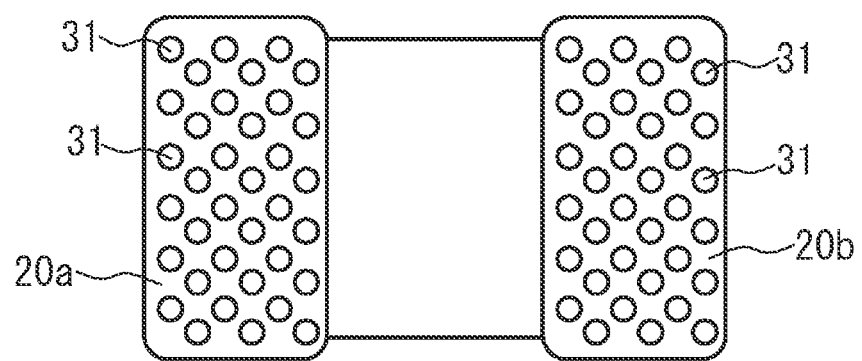
FIG. 7 illustrates a glass pattern.
Figure 8:
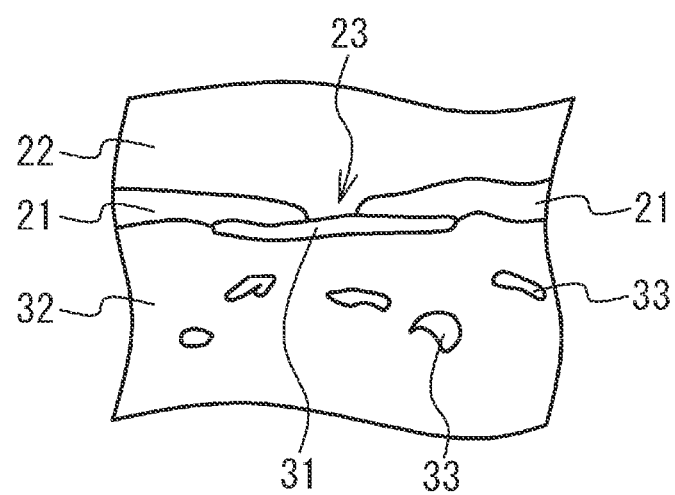
FIG. 8 illustrates a glass pattern.

Specifically, the external electrodes 20a and 20b have a plurality of glass patterns 31 on their surfaces, as illustrated in FIG. 7. FIG. 7 is a view when the external electrodes 20a and 20b are observed seen through the plated layer 25. At least two of the plurality of glass patterns 31 are separated from each other. FIG. 8 is a cross-sectional view of the vicinity of the glass pattern 31 of the external electrode 20a. In FIG. 8, hatches showing cross sections are omitted. As illustrated in FIG. 8, the inside of the external electrode 20a is mainly occupied by a main phase 32 of the main component metal. A glass component 33 may be located inside the external electrode 20a. The glass pattern 31 is precipitated on the surface of the external electrode 20a. The glass pattern 31 is similarly precipitated on the surface of the external electrode 20b.

Plating is difficult to form on the surface of the glass pattern 31 during the plating process. Therefore, as illustrated in FIG. 8, the first plated layer 21 is discontinued on the surface of the glass pattern 31. Therefore, the first plated layer 21 has a discontinuous portion 23 at the position of the glass pattern 31. The second plated layer 22 may cover the discontinuous portion 23 or may be interrupted at the position of the discontinuous portion 23.

According to this embodiment, the glass patterns 31 are dotted on the surfaces of the external electrodes 20a and 20b and spaced apart from each other. As a result, the discontinuous portion 23 is formed instead of the first plated layer 21 covering the entire external electrodes 20a and 20b. With this configuration, the tensile stress of the first plated layer 21 can be reduced. Moreover, the adhesion force at the interfaces between the external electrodes 20a and 20b and the first plated layers 21 can be reduced. Even if deflection stress occurs after the multilayer ceramic capacitor 100 is mounted on the circuit board 201, the stress applied to the inside of the first plating layer 21 is reduced because the tensile stress of the first plated layer 21 is reduced. Therefore, the multilayer ceramic capacitor 100 is more resistant to mechanical stress. Moreover, peeling may occur at the interfaces between the external electrodes 20a and 20b and the first plated layers 21, and it is possible to relax the deflection stress. As described above, the strength to deflection after mounting can be improved. Moreover, in this configuration, it is not necessary to provide a conductive resin layer between the external electrodes 20a and 20b and the plated layers 25, so that the multilayer ceramic capacitor 100 can be miniaturized and increased in capacity. In addition, since the step of applying, drying and curing the resin paste containing the metal filler can be omitted, the cost can be suppressed.

The glass pattern 31 is composed of a glass component. For example, the glass pattern 31 contains zirconium as a component. The material of the glass pattern 31 is, for example, $BaO—B_2O_3—ZnO—ZrO_2$-based material, $SiO_2—ZrO_2—R_2O$-based material, or the like.

If each of the plurality of glass patterns 31 is too large, wettability may be poor. Therefore, it is preferable to set an upper limit for each size of the plurality of glass patterns 31. For example, each of the plurality of glass patterns 31 is preferably a pattern formed within a circular range with a diameter of 30 μm or less, and more preferably a pattern formed within a circular range with a diameter of 25 μm or less.

On the other hand, if each of the plurality of glass patterns 31 is too small, the discontinuous portion 23 may not be sufficiently formed. Therefore, it is preferable to set a lower limit for each size of the plurality of glass patterns 31. For example, each of the plurality of glass patterns 31 is preferably a pattern formed within a circular range having a diameter of 10 μm or more, and more preferably a pattern formed within a circular range having a diameter of 15 μm or more.

Figure 9:
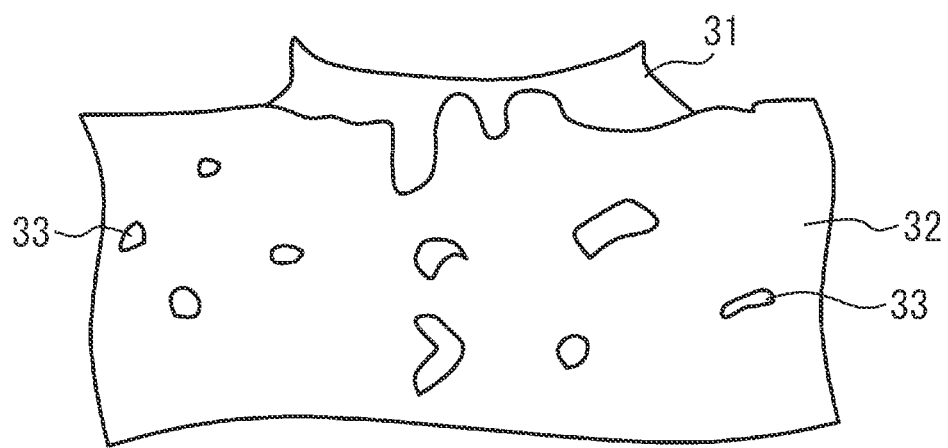
FIG. 9 illustrates a shape of a glass pattern.

The plurality of glass patterns 31 have a substantially circular shape, as illustrated in FIG. 7. The glass pattern 31 does not have to be a perfect circle, and may have a shape that deviates from a perfect circle. Further, for example, the plurality of glass patterns 31 may have a concave central portion and a convex peripheral portion, as illustrated in FIG. 9. This is because the convexity increases the distance and acts in the direction of hindering the formation of the plating. In addition, in FIG. 9, the hatch which shows a cross section is omitted.

Figure 10:
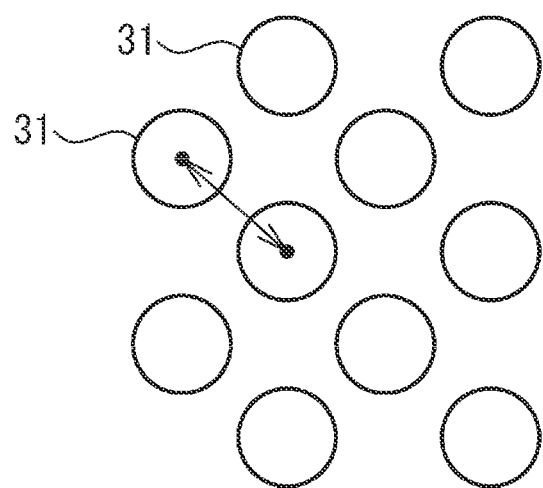
FIG. 10 illustrates a distance between glass patterns.

Also, if the plurality of glass patterns 31 are far from each other, there is a risk that the strength to deflection after mounting will not be sufficiently improved. Therefore, it is preferable to set a lower limit and an upper limit for the intervals between the plurality of glass patterns 31. For example, as illustrated in FIG. 10, it is preferable that the distance between the center positions of at least two of the plurality of glass patterns 31 is less than 100 μm. Alternatively, for the plurality of glass patterns 31, it is preferable that the average value of the distance between the center positions of each two adjacent glass patterns 31 is less than 100 μm. Moreover, it is preferable that the distance between the center positions of at least two of the plurality of glass patterns 31 is less than 63 μm. Alternatively, for the plurality of glass patterns 31, it is preferable that the average value of the distance between the center positions of each two adjacent glass patterns 31 is less than 63 μm. In each of the glass patterns 31, the center position can be determined as the center of gravity of each of the glass patterns 31.

At least two of the plurality of glass patterns 31 preferably have a separation distance of 50 μm or less. Alternatively, for the plurality of glass patterns 31, it is preferable that the average value of the distance between the center positions of each two adjacent glass patterns 31 is 50 μm or less.

In order to form the glass pattern 31 on the external electrodes 20a and 20b, it is preferable to bake the external electrodes 20a and 20b at a relatively low temperature. Therefore, instead of firing the external electrodes 20a and 20b at the same time when firing the multilayer chip 10, the external electrodes 20a and 20b can be baked at a temperature lower than the firing temperature of the multilayer chip 10 after the multilayer chip 10 is fired. Therefore, it is preferable to use copper as the main component of the external electrodes 20a and 20b.

For example, the external electrodes 20a and 20b are not formed only on the two end faces of the multilayer chip 10, but extend to the upper face, the lower face and the two side faces of the multilayer chip 10. In this case, it is preferable that more glass patterns 31 are distributed on the top face and the lower face than on each of the two side faces and the two end faces of the multilayer chip 10. This is because the stress at the time of deflection is applied to the E dimension tips of the upper face and the lower face rather than the end faces, so that the upper face and the lower face are more strongly affected. In addition, "distribution" here is an exclusive area.

If the total area of the glass patterns 31 with respect to the surface area of the external electrodes 20a and 20b is low, there is a risk that the strength to deflection after mounting will not be sufficiently improved. Therefore, it is preferable to set a lower limit for the area of the glass patterns 31. In this embodiment, the total area of the glass patterns 31 with respect to the total surface area of the external electrodes 20a and 20b is preferably 11% or more, more preferably 16% or more, and 20% or more.

On the other hand, if the total area of the glass patterns 31 is large, poor wettability may occur. Therefore, it is preferable to set an upper limit for the area of the glass patterns 31. In this embodiment, the total area of the glass patterns 31 with respect to the total surface area of the external electrodes 20a and 20b is preferably 33% or less.

Figure 11:
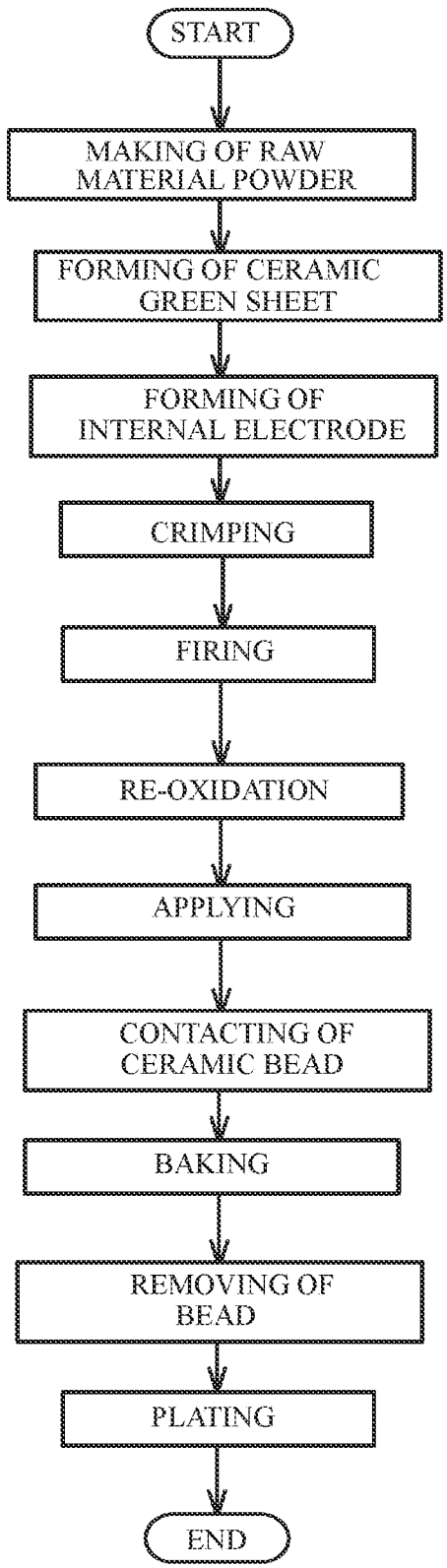
FIG. 11 is a diagram illustrating a flow of a manufacturing method of a multilayer ceramic capacitor.

Next, a method for manufacturing the multilayer ceramic capacitors 100 will be described. FIG. 11 is a diagram illustrating the flow of the manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiments may use any of these methods.

An additive compound may be added to the resulting ceramic powder, in accordance with purposes. The additive compound may be an oxide of magnesium (Mg), manganese (Mn), molybdenum (Mo), vanadium (V), chromium (Cr), rare earth elements (yttrium (Y), samarium (Sm), europium (Eu), gadolinium (Gd), terbium (Tb), dysprosium (Dy), holmium (Ho), erbium (Er), thulium (Tm) and ytterbium (Yb)) or an oxide of Co (cobalt), Ni (nickel), Li (lithium), B (boron), Na (sodium), K (potassium) or Si (silicon), or a glass including cobalt, nickel, lithium, boron, sodium, potassium or silicon. Among the additive compounds, $SiO_2$ acts as a sintering assistant.

For example, the resulting ceramic raw material powder is wet-blended with additives and is dried and crushed. Thus, a ceramic material is obtained. For example, the particle diameter may be adjusted by crushing the resulting ceramic material as needed. Alternatively, the particle diameter of the resulting ceramic power may be adjusted by combining the crushing and classifying. With the processes, a dielectric material is obtained.

(Forming process of ceramic green sheet) Next, a binder such as polyvinyl butyral (PVB) resin, an organic solvent such as ethanol or toluene, and a plasticizer are added to the resulting dielectric material and wet-blended. With use of the resulting slurry, a ceramic green sheet 52 is formed on a base material 51 by, for example, a die coater method or a doctor blade method, and then dried. The base material 51 is, for example, PET (polyethylene terephthalate) film.

Figure 12A:
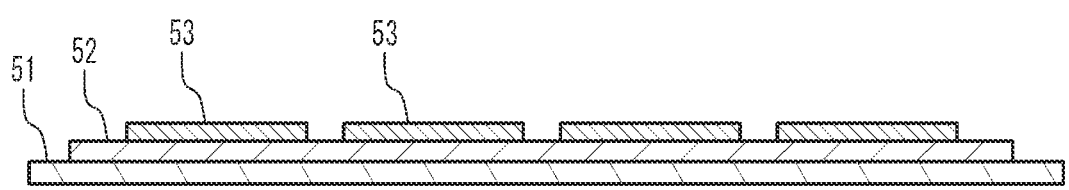
FIG. 12A and FIG. 12B illustrate a flow of a manufacturing method of a multilayer ceramic capacitor.

(Forming process of internal electrode) Next, as illustrated in FIG. 12A, an internal electrode pattern 53 is formed on the ceramic green sheet 52. In FIG. 12A, as an example, four parts of the internal electrode pattern 53 are formed on the ceramic green sheet 52 and are spaced from each other. The ceramic green sheet 52 on which the internal electrode pattern 53 is formed is a stack unit. For the internal electrode pattern 53, a metal paste of the first metal of the internal electrode layer 12 is used. The method of film formation may be printing, sputtering, vapor deposition, or the like.

Figure 12B:
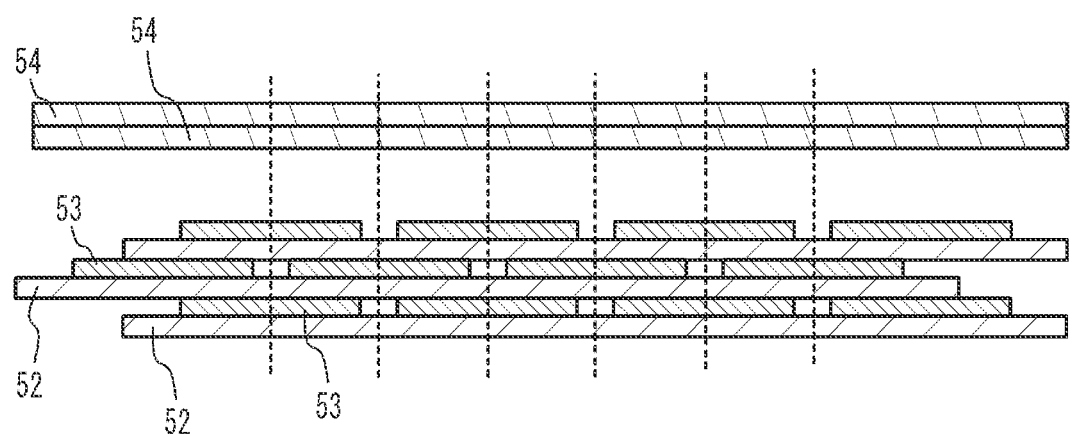

(Crimping process) Next, the ceramic green sheets 52 are peeled from the base materials 51. As illustrated in FIG. 12B, the stack units are stacked. Next, a predetermined number (for example, 2 to 10) of a cover sheet 54 is stacked on an upper face and a lower face of a ceramic multilayer structure of the stacked stack units and is thermally crimped. The resulting ceramic multilayer structure is cut into a chip having a predetermined size (for example, 1.0 mm×0.5 mm). In FIG. 12B, the multilayer structure is cut along a dotted line. The components of the cover sheet 54 may be the same as those of the ceramic green sheet 52. Alternatively, the additive in the cover sheet 54 may be different from that in the ceramic green sheet 52.

(Firing process) The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C.

(Re-oxidizing process) After that, a re-oxidation process may be performed in $N_2$ gas atmosphere at 600 degrees C. to 1000 degrees C.

(Applying process) Next, a conductive paste for forming external electrodes, which will be the external electrodes 20a and 20b, is applied to each of the two end faces of the multilayer chip 10 by a dipping method or the like. In this case, the conductive paste may be applied so as to extend from the two end faces of the multilayer chip 10 to the upper face, the lower face, and the two side faces. The conductive paste contains powder of the main component metal of the external electrodes 20a and 20b, and also contains a glass component such as glass frit.

Figure 13:
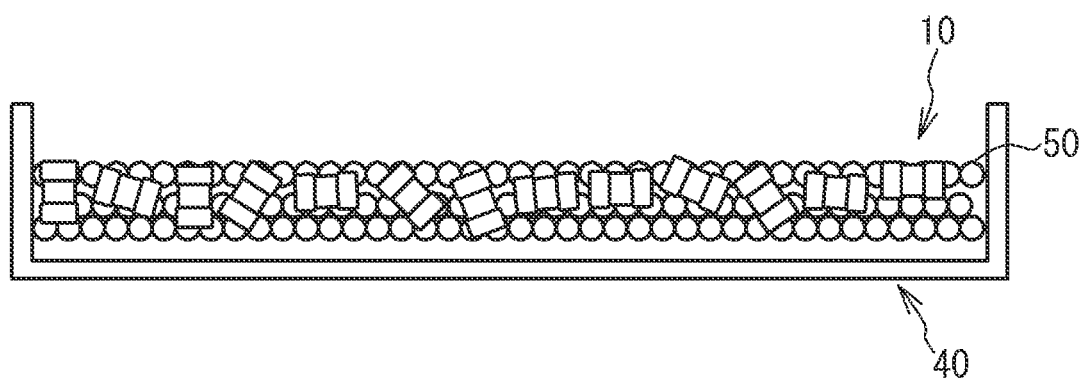
FIG. 13 illustrates a contacting of ceramic beads.

(Contacting process of ceramic bead) Next, a plurality of the multilayer chips 10 coated with conductive paste are arranged on the baking jig 40. In this case, as illustrated in FIG. 13, the baking jig 40 is covered with ceramic beads 50. When each of the multilayer chips 10 is placed on the baking jig 40, the conductive paste on each of the multilayer chips 10 comes into contact with the ceramic beads 50. If the conductive paste on each of the multilayer chips 10 is not sufficiently in contact with the ceramic beads 50, the ceramic beads 50 may be sprinkled over each of the multilayer chips 10 from above. As the ceramic beads 50, zirconium oxide ($ZrO_2$) or the like can be used.

Figure 14:
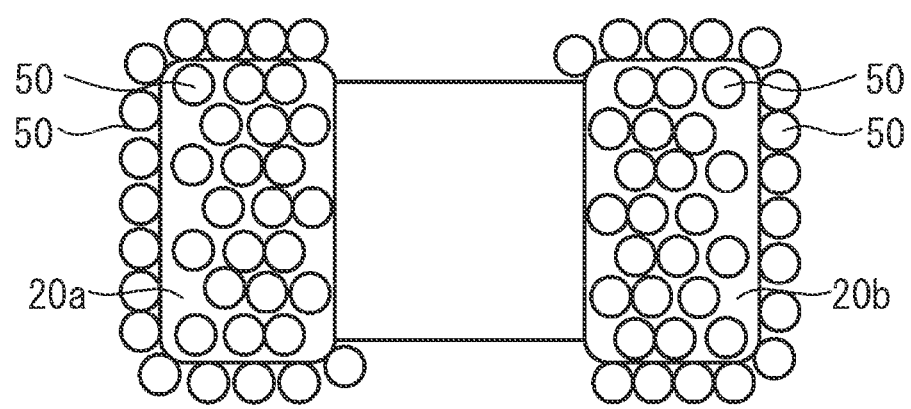
FIG. 14 illustrates a baking process.
Figure 15:
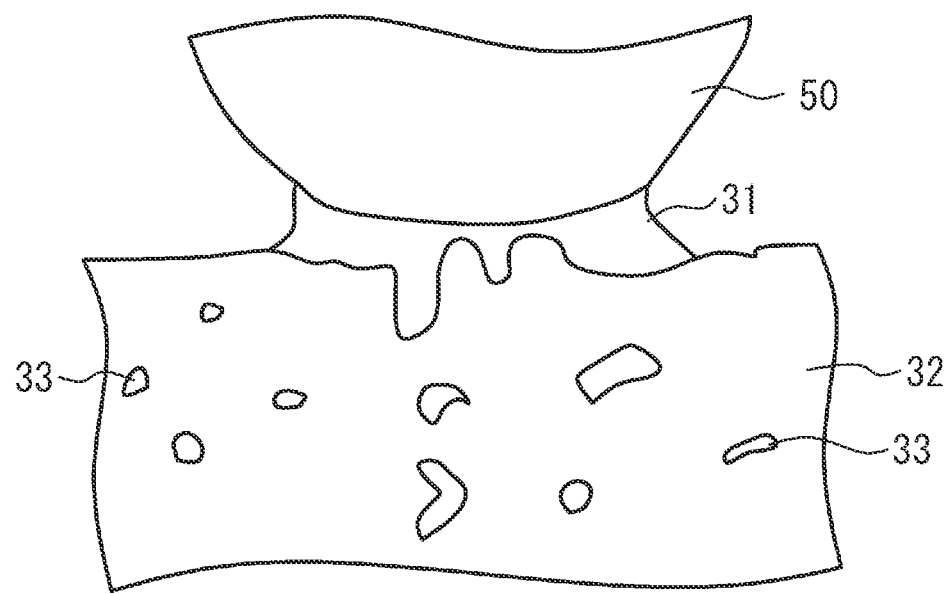
FIG. 15 illustrates a multilayer ceramic capacitor after baking an external electrode.

(Baking process) Next, the conductive paste is thermally treated at a temperature of 800° C. or higher and 880° C. or lower, thereby baking the external electrodes 20a and 20b onto the multilayer chip 10. In this case, as illustrated in FIG. 14, glass frit is precipitated on the surfaces of the external electrodes 20a and 20b, and the precipitated glass frit gathers at the contact points of the ceramic beads 50. The ceramic beads 50 adhere to the surfaces of the external electrodes 20a and 20b via the glass frit. Since the ceramic beads 50 have a substantially spherical shape, the gathered glass frit has a substantially circular shape. The gathered glass frit becomes the glass pattern 31. FIG. 15 is a diagram illustrating the multilayer ceramic capacitor 100 after the external electrodes 20a and 20b are baked. As illustrated in FIG. 15, the ceramic beads 50 are attached to the surfaces of the external electrodes 20a and 20b. In addition, in FIG. 15, the hatch which shows a cross section is omitted.

(Removing process of bead) Next, the ceramic beads 50 adhering to the multilayer ceramic capacitor 100 are removed. For example, blasting or dry polishing can be used to remove the ceramic beads 50 from the multilayer ceramic capacitor 100.

(Plating process) After that, the plated layer 25 is formed by coating the external electrodes 20a and 20b with a metal such as copper, nickel, or tin by plating. In this case, at least the first plated layer 21 is subjected to the plating process so as to have the discontinuous portion 23 at the location of the glass pattern 31. The second plated layer 22 may cover the discontinuous portion 23, but may be discontinuous at the glass pattern 31.

According to the manufacturing method according to this embodiment, the glass patterns 31 are scattered on the surfaces of the external electrodes 20a and 20b while being spaced apart from each other. As a result, the discontinuous portion 23 is formed instead of the first plated layer 21 covering the entire external electrodes 20a and 20b. With this configuration, the tensile stress of the first plated layer 21 can be reduced. Moreover, the adhesion force at the interface between the external electrodes 20a and 20b and the first plated layer 21 can be reduced. Even if deflection stress occurs after the multilayer ceramic capacitor 100 is mounted on the circuit board 201, the stress applied to the inside of the first plated layer 21 is reduced because the tensile stress of the first plated layer 21 is reduced. And the multilayer ceramic capacitor 100 becomes more resistant to mechanical stress. Moreover, peeling may occur at the interface between the external electrodes 20a and 20b and the first plated layer 21, and it is possible to relax the deflection stress. As described above, the strength to deflection after mounting can be improved. Moreover, in this configuration, it is not necessary to provide a conductive resin layer between the external electrodes 20a and 20b and the plated layer 25, so that the multilayer ceramic capacitor 100 can be miniaturized and increased in capacity. In addition, since the process of applying, drying and curing the resin paste containing the metal filler can be omitted, the cost can be suppressed.

Further, according to the manufacturing method of the present embodiment, baking is performed in a state in which the ceramic beads are arranged around the multilayer chip. In this case, the multilayer chip surrounded by the ceramic beads moves smoothly due to vibration during belt transportation and shrinkage during sintering of the external electrodes, and the contact between the multilayer chips can be removed. As a result, the occurrence rate of fusion bonding can be greatly reduced. Moreover, not only is the yield of fusion bonding itself improved, but it is also possible to reduce the number of products with defective appearance when the fusion bonds are separated from each other.

The distance between two adjacent center positions of the plurality of glass patterns 31 can be adjusted by the grain size of the ceramic beads 50. For example, for at least two of the plurality of glass patterns 31, the grain size of the ceramic beads 50 is preferably greater than µm and less than 100 µm so that the distance between the center positions is greater than 10 µm and less than 100 µm. For example, the grain size of the ceramic beads 50 is preferably less than 63 µm so that the distance between the center positions of at least two of the plurality of glass patterns 31 is less than 63 µm.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

Hereinafter, the multilayer ceramic capacitor according to the embodiment was manufactured and its characteristics were investigated.

(Examples 1 to 7) A fired multilayer chip was prepared, and conductive paste for external electrodes was applied from two end faces of the multilayer chip so as to extend to the upper face, the lower face, and the two side faces. A glass frit was added to the conductive paste, then ceramic beads of zirconium oxide were spread, and the multilayer chip was arranged on the ceramic beads, and the ceramic beads were brought into contact with the conductive paste. After that, additional ceramic beads were sprinkled on top. As a result, the ceramic beads adhered to the conductive paste on the two end faces, the upper face, the lower face, and the two side faces of the multilayer chip. After that, the external electrodes were baked. At that time, the ceramic beads stuck to the glass on the surface of the external electrode. After that, the ceramic beads were removed. After removing the ceramic beads, two layers, a first plated layer and a second plated layer, were formed on the surfaces of the external electrodes.

In Examples 1 to 6, zirconium oxide ($ZrO_2$) ceramic beads were used. In Example 7, zirconium oxide ($ZrO_2$) ceramic beads and silicon oxide ($SiO_2$) ceramic beads were used. The bead diameter of the ceramic beads was 50 µm in Example 1, 100 µm in Example 2, 30 µm in Example 3, 10 µm in Example 4, 50 µm in Example 5, 50 µm in Example 6, and less than 63 m in Example 7.

The baking temperature of the external electrodes was 840° C. for Examples 1 to 4 and 7, 800° C. for Example 5, and 880° C. for Example 6. In any of Examples 1 to 7, the shape of the multilayer ceramic capacitor was 107 shape (length 1600 µm, width 800 µm, height 800 µm).

The average diameter of the glass pattern was 25 µm in Example 1, 35 µm in Example 2, 18 µm in Example 3, 21 µm in Example 5, 30 µm in Example 6, and less than 28 µm in Example 7. The average diameter was obtained by measuring the area of each glass pattern and calculating the diameter of a circle corresponding to the area (equivalent circle diameter).

The average distance between the centers of two adjacent glass patterns was 50 μm in Example 1, 100 μm in Example 2, 30 μm in Example 3, and 50 μm in Example 5, 50 μm in Example 6, and less than 63 μm in Example 7.

The total area of the glass pattern with respect to the surface area of the external electrode was 23% in Example 1, 11% in Example 2, 33% in Example 3, and 16% in Example 5, 33% in Example 6, and 27% in Example 7.

For each of Examples 1 to 7, when the SEM photograph of the cross section of the portion where the ceramic beads were stuck was confirmed, a large number of circular glass patterns were formed. Each glass pattern had a concave central portion and a convex peripheral portion. These glass patterns are ceramic bead marks. Moreover, it was confirmed that a discontinuous portion was formed in the first plated layer at the location of the glass pattern.

(Comparative example) In Comparative Example, the external electrodes were baked without contacting the ceramic beads with the conductive paste for external electrodes. Other conditions were the same as in Example 1.

A crack test was performed on the multilayer ceramic capacitors of Examples 1 to 7 and Comparative Example. Specifically, a deflection test (mounted on a dedicated substrate, displaced 2 mm from the back side) was performed. For each of Examples 1 to 7 and Comparative Example, the number of samples was set to 10, and the ratio of samples in which cracks occurred (crack generation rate) was measured. Table 1 shows the results.

In addition, the fusion rate was examined for the multilayer ceramic capacitors of Examples 1 to 7 and Comparative Example. The number of samples was 8000 for each of Examples 1 to 7 and Comparative Example. The fusion rate was defined as the ratio of the number of samples in which fusion was confirmed to 8000 samples. Table 1 shows the results. As shown in Table 1, the fusion rate was as high as 456/8000 in Comparative Example. It is considered that this is because the multilayer chips came into contact with each other because the ceramic beads were not adhered to the multilayer chips. In contrast, in Examples 1 to 7, the fusion rate was 40/8000 or less. It is considered that this is because contact between the multilayer chips was suppressed by adhering the ceramic beads to the multilayer chips.

(Examples 8 and 9) In Examples 8 and 9, no additional ceramic beads were sprinkled. As a result, the ceramic beads did not adhere to the conductive paste on the two end faces of the multilayer chip, and the ceramic beads adhered only to the conductive paste on the upper face, the lower face, and the two side faces of the multilayer chip.

In Example 8, zirconium oxide ($ZrO_2$) ceramic beads were used. In Example 9, zirconium oxide ($ZrO_2$) ceramic beads and silicon oxide ($SiO_2$) ceramic beads were used. The bead diameter of the ceramic beads was 50 μm in Example 8 and less than 63 μm in Example 9. The baking temperature of the external electrodes was 840° C. in Examples 8 and 9. In any of Examples 1 to 7, the shape of the multilayer ceramic capacitor was 107 shape. The average diameter of the glass pattern was 25 μm in Example 8 and less than 28 μm in Example 9.

For each of Examples 8 and 9, when the SEM photograph of the cross section of the portion where the ceramic beads were stuck was confirmed, a large number of circular glass patterns were formed. Each glass pattern had a concave

TABLE 1

| | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 |
| --- | --- | --- | --- | --- | --- | --- | --- | --- |
| BEAD | | $ZrO_2$ | $ZrO_2$ | $ZrO_2$ | $ZrO_2$ | $ZrO_2$ | $ZrO_2$ | $ZrO_2/SiO_2$ |
| BEAD DIAMETER | | 50 μm | 100 μm | 30 μm | 10 μm | 50 μm | 50 μm | <63 μm |
| BAKING TEMPERATURE | 840° C. | 840° C. | 840° C. | 840° C. | 840° C. | 800° C. | 880° C. | 840° C. |
| SIZE | 107 | 107 | 107 | 107 | 107 | 107 | 107 | 107 |
| GLASS PATTERN SIZE | | 25 μm | 35 μm | 18 μm | DIFFICULT | 21 μm | 30 μm | <28 μm |
| DISTANCE OF CENTERS | | 50 μm | 100 μm | 30 μm | | 50 μm | 50 μm | <63 μm |
| AREA RATIO | 0% | 23% | 11% | 33% | | 16% | 33% | 27% |
| CRACK TEST | 3/10 | 0/10 | 1/10 | 0/10 | | 0/10 | 0/10 | 0/10 |
| FUSION RATE | 456/8000 | 0/8000 | 40/8000 | 0/8000 | 0/8000 | 0/8000 | 0/8000 | 0/8000 |

As shown in Table 1, the crack occurrence rate was as high as 3/10 in Comparative Example. This is probably because no glass pattern was formed on the surface of the external electrode and no discontinuity was formed in the first plated layer because ceramic beads were not used. On the other hand, in Examples 1 to 7, the ratio of occurrence of cracks was 1/10 or less. This is probably because the use of ceramic beads formed a glass pattern on the surface of the external electrode, and a discontinuous portion was formed in the first plated layer at the location of the glass pattern, increasing the strength to deflection.

central portion and a convex peripheral portion. These glass patterns were ceramic bead marks. Moreover, it was confirmed that a discontinuous portion was formed in the first plated layer at the location of the glass pattern.

The fusion rates of the multilayer ceramic capacitors of Examples 1, 8, 9 and Comparative Example were examined again. The number of samples was 2000 for each of Examples 1, 8, 9 and Comparative Example. The fusion ratio was defined as the ratio of the number of samples in which fusion was confirmed to 2000 samples. Table 2 shows the results. As shown in Table 2, the fusion rate was as high as 114/2000 in Comparative Example. It is considered that this is because the multilayer chips came into contact with each other because the ceramic beads were not adhered to the multilayer chips. In contrast, in Examples 1, 8 and 9, the fusion rate was 0/2000. It is considered that this is because contact between the multilayer chips was suppressed by adhering the ceramic beads to the multilayer chips.

TABLE 2

|  | COMPARATIVE EXAMPLE | EXAMPLE 1 | EXAMPLE 2 | EXAMPLE 3 |
| --- | --- | --- | --- | --- |
| BEAD |  | $ZrO_2$ | $ZrO_2$ | $ZrO_2/SiO_2$ |
| BEAD DIAMETER |  | 50 μm | 50 μm | <63 μm |
| BAKING TEMPERATURE | 840° C. | 840° C. | 840° C. | 840° C. |
| ADDITIONAL SPRINKLE |  | DONE | NONE | NONE |
| SIZE | 107 | 107 | 107 | 107 |
| GLASS PATTERN SIZE |  | 25 μm | 25 μm | <28 μm |
| FUSION RATE | 114/2000 | 0/2000 | 0/2000 | 0/2000 |

Although the embodiments of the present invention have been described in detail, it is to be understood that the various change, substitutions, and alterations could be made hereto without departing from the spirit and scope of the invention.

What is claimed is:

1. A multilayer ceramic electronic device comprising:
   a multilayer chip having a plurality of dielectric layers and a plurality of internal electrode layers facing each other through each of the plurality of dielectric layers;
   an external electrode that is provided on an end face of the multilayer chip in a second direction orthogonal to a first direction in which the plurality of internal electrode layers face each other, and has a plurality of glass portions that are spaced from each other on a surface of the external electrode; and
   a plated layer that is provided on the external electrode and has discontinuous portions on the plurality of glass portions.

2. The multilayer ceramic electronic device as claimed in claim 1, wherein each of the plurality of glass portions is formed on the surface of the external electrode within each of circular shapes having a diameter of 10 μm or more and 30 μm or less.

3. The multilayer ceramic electronic device as claimed in claim 1, wherein each of the plurality of glass portions has a substantially circular shape in a planar view of the external electrode.

4. The multilayer ceramic electronic device as claimed in claim 1, wherein each of the plurality of glass portions has a concave central portion and a convex peripheral portion when viewed from a cross section direction of the external electrode.

5. The multilayer ceramic electronic device as claimed in claim 1, wherein a distance between center positions of at least two of the plurality of glass portions is more than 10 μm and less than 100 μm.

6. The multilayer ceramic electronic device as claimed in claim 1, wherein a distance between center positions of at least two of the plurality of glass portions is less than 63 μm.

7. The multilayer ceramic electronic device as claimed in claim 1, wherein the plurality of glass portions includes zirconium.

8. The multilayer ceramic capacitor as claimed in claim 1, wherein a main component of the external electrode is copper.

9. The multilayer ceramic capacitor as claimed in claim 1,
   wherein the external electrode extends to main faces of the multilayer chip located at ends in the first direction and side faces of the multilayer chip located at ends in a third direction orthogonal to the first direction and the second direction, and
   wherein the plurality of glass portions are distributed in a larger area on the main faces than on each of the side faces and the end faces.

10. The ceramic electronic device as claimed in claim 1, wherein a total area of the plurality of glass portions is 16% or more and 33% or less of an area of the external electrode.

* * * * *